United States Patent [19]
Harris

[11] 3,721,514
[45] March 20, 1973

[54] BLOW MOLDING APPARATUS INCLUDING BALL SPLINE SHAFT FOR RAPID AND PRECISE PARISON TRANSFER

[75] Inventor: Michael R. Harris, Bartlesville, Okla.

[73] Assignee: Phillips Petroleum Company, Bartlesville, Okla.

[22] Filed: Aug. 18, 1971

[21] Appl. No.: 172,744

[52] U.S. Cl. ................................... 425/387, 425/326
[51] Int. Cl. .............................................. B29d 23/03
[58] Field of Search ....... 425/387 B, 215, 326 B, 377, 425/324 B; 264/98, 99

[56] References Cited

UNITED STATES PATENTS 3,283,046   11/1966   De Witt et al. .................... 425/387 X
3,311,684   3/1967    Heider .............................. 425/326 X
3,357,046   12/1967   Pechthold .......................... 425/326 X
3,616,490   11/1971   Szabo ................................. 425/326
3,587,133   6/1971    Valyi ................................. 425/387

FOREIGN PATENTS OR APPLICATIONS 1,249,682   11/1960   France ................................ 425/326
  940,957   11/1963   Great Britain ..................... 425/326

Primary Examiner—J. Spencer Overholser
Assistant Examiner—Michael O. Sutton
Attorney—J. Arthur Young et al.

[57] ABSTRACT

Parisons are removed from a heating means and positioned precisely on a neck forming assembly preparatory to blow molding by a transfer arm carried by a ball bearing spline shaft which allows vertical movement and rapid rotation without angular backlash.

7 Claims, 4 Drawing Figures

INVENTOR.
M.R. HARRIS

BY *Jaung + Lugg*

ATTORNEYS

INVENTOR.
M.R. HARRIS

BLOW MOLDING APPARATUS INCLUDING BALL SPLINE SHAFT FOR RAPID AND PRECISE PARISON TRANSFER

BACKGROUND OF THE INVENTION

This invention relates to apparatus for blow molding reheated parison preforms which must be transferred from a heating means to a blowing station.

Blow molding hollow articles such as bottles and the like from reheated parison preforms so as to take advantage of the strengthening effect of molecular orientation is known in the art. Exemplary of such art is Wiley et al., U.S. Pat. No. 3,507,005. Inherent in such a molding technique is the necessity for transferring parisons from a heating means to a molding station. In laboratory or development scale equipment this can easily be accomplished either by hand or by mechanical means such as is shown in said Wiley et al. patent. However, for such a technique to be successful on a commercial scale it is necessary to reduce the cycle time to a minimum. Since the parison is already at orientation temperature, the time required in the mold for it to cool to a completely self-supporting state is quite low. Thus it is theoretically possible to achieve a cycle time of as low as 6 seconds. However, it turns out that the limiting factor can be the speed at which the parisons can be transferred from a heating means to a molding station. Devices of the prior art have been found to require a cycle time of at least twice the theoretical minimum.

BRIEF SUMMARY OF THE INVENTION

It is an object of this invention to make possible the production of bottles and the like from reheated parisons at high production rates;

and it is yet a further object of this invention to reduce rejects and imperfectly formed bottles due to poor positioning of the parison in the molding station.

In accordance with this invention, vertically disposed parisons are grasped at the upper end thereof by a gripping means carried by an arm attached to a ball bearing spline shaft, whereupon the ball bearing spline shaft is moved axially upward thus lifting the parison up out of the heating means, whereupon said ball spline shaft carried by a bearing means is rotated about its axis so as to transfer said parison in an arc to a position over a neck forming assembly and thereafter said ball bearing spline shaft is moved axially downward to position said parison on said neck forming assembly.

BRIEF DESCRIPTION OF THE DRAWINGS

In the drawings, forming a part hereof, wherein like reference characters denote like parts in various views.

DESCRIPTION OF THE PREFERRED EMBODIMENTS

The apparatus of this invention can be utilized in the blow molding of any type of hollow article from a tubular parison preform. Primarily it is of utility in the forming of biaxially oriented hollow articles such as bottles from parison preforms which have been reheated to orientation temperature. By orientation temperature it is meant that temperature at which a polymer on stretching exhibits an increase in strength. For crystalline polymers this is generally in the range of 1–50, preferably 10°–30°F below the crystalline melting point. For amorphous polymers the temperature is generally within the range of 40–225, preferably 100°–175°F below the homogeneous melt point. Exemplary crystalline polymers are polymers and copolymers of at least one mono-1-olefin having two–eight carbon atoms per molecule, preferably polypropylene. Exemplary of amorphous polymers are polyvinylchloride, polystyrene, various styrene/butadiene-containing resins and the like.

The ball bearing splines which are utilized in the parison transfer mechanism of this invention are commercially available, for instance, from the Saginaw Steering Gear Division of General Motors Corporation, and therefore need not be described in detail.

Preferably two ball nuts are utilized with one rotated slightly relative to the other so as to preload the balls against the inner race to eliminate angular backlash.

The heating means can be any suitable means for heating parison preforms to orientation temperature such as an air oven, a radiant heating chamber or the like which can be utilized to heat the parisons and deliver them at orientation temperature in a vertical position to a picker station.

Figure 1:
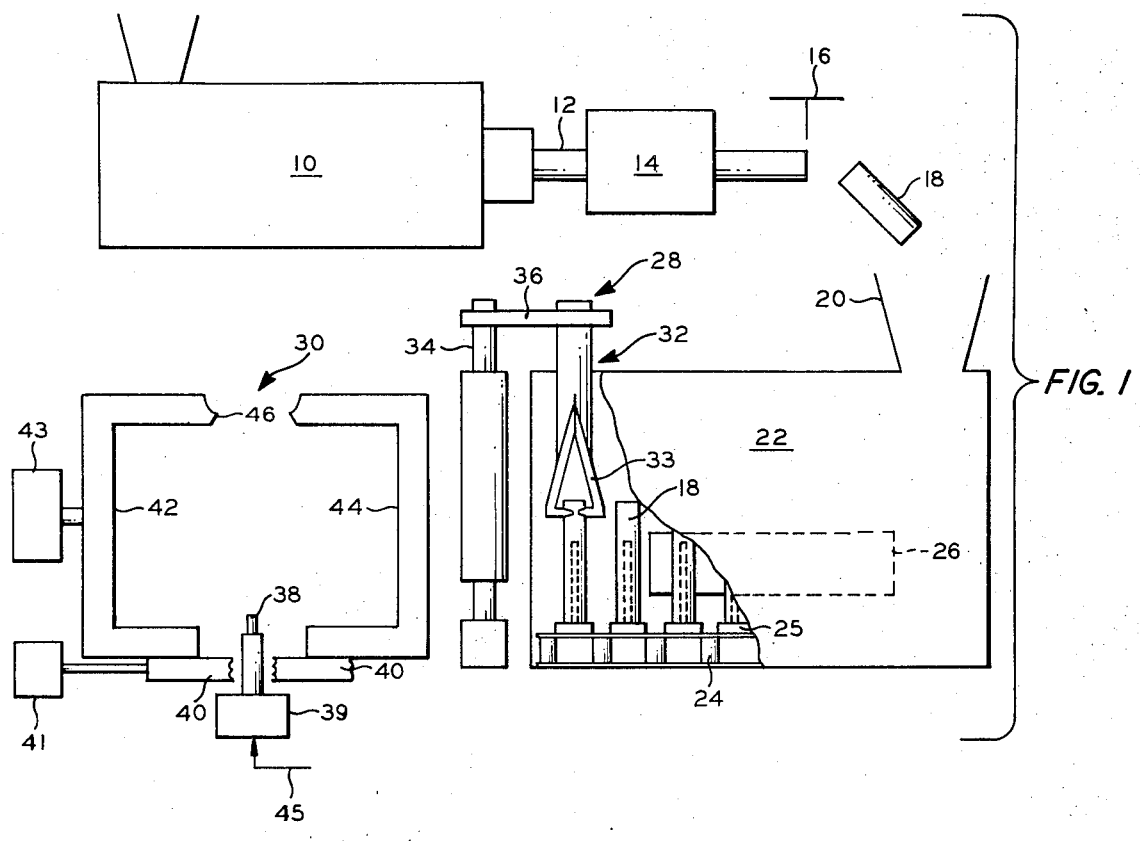
FIG. 1 is a side elevation with parts cut away, of a blow molding apparatus having a parison transfer mechanism utilizing a ball bearing spline shaft.

Referring now to the drawings, particularly FIG. 1, there is shown a schematic representation of a blow molding operation utilizing the apparatus of this invention. Extruder 10 forms a tubular extrudate 12 which passes to cooling and sizing zone 14 and thence to cutting means 16 where it is cut into individual open end tubular parison preforms 18 which fall into loading hopper 20 of oven 22. Oven 22 is a circulating air oven having a continuous chain 24 with spaced parison support means 25 for conveying parisons 18 therethrough in an upright manner. Radiant heaters 26 provide supplemental heat to aid in more quickly and uniformly heating the parisons to orientation temperature.

Parison transfer mechanism designated generally by reference character 28 transfers the parisons from oven 22 to the molding station generally designated by reference character 30. The construction of transfer mechanism 28 will be described in greater detail in reference to FIGS. 2 and 3. At the point in the cycle depicted in FIG. 1, gripping means 32 of the parison transfer mechanism has grasped the upper open end of a parison. Ball bearing spline shaft 34 attached to arm 36 which carries gripping means 32 is raised axially upward so as to lift parison 18 upward out of the oven. Thereafter shaft 34 rotates about its axis moving parison 18 in an arc and stopping with parison 18 positioned directly above thread-forming plug 38. Shaft 34 then descends positioning the bottom open end of parison 18 over plug 38. Thread-forming jaws 40 then close and optionally plug 38 is advanced axially upward an additional distance into the open end of said parison to thus form the thread and/or neck area. Ball spline shaft 34 then moves axially upward again thus stretching the parison between thread-forming jaws 40 and tongs 33. This stretching operation terminates just as the gripping means clears above the top of mold halves 42 and 44. Molds halves 42 and 44 then converge with the blade 46 of mold half 42 severing and sealing the parison. Fluid pressure is then introduced via line 45 to expand said parison into conformity with the mold cavity to form a biaxially oriented bottle. During this time, shaft 34 is rotated to position means 32 over a scrap receiving means whereupon gripping tongs 33 open up to deposit the severed end of parison 18. Rotation of shaft 34 continues until means 32, with the gripping tongs 33 in an open position, is again placed over a parison in oven 22 whereupon shaft 34 descends and gripping tongs 33 of means 32 close on the parison. The mold halves then open and the thus-formed bottle is removed. By this time transfer mechanism 28 has the next parison ready for positioning over plug 38. Plug 38 is moved axially upward and downward by means of cylinder 39. Jaw means 40 are moved into and out of engagement by means of cylinder 41 and mold halves 42 and 44 are opened and closed by means of air cylinder 43. Air is introduced into the interior of the parison to effect expansion of same via line 45 which feeds into a hollow core of plug 38.

This arrangement involves a bare minimum of movements and further allows discard of the pinched off end of the parison and transfer of a new parison during the time the parison in the mold is cooling. This drastically reduces cycle time but requires rapid start and stop rotary movements of the parison transfer mechanism in addition to axial movement thereof. Yet, tolerances are very close since there is little margin for error in the positioning of the parison over plug 38.

Figures 2, 3:
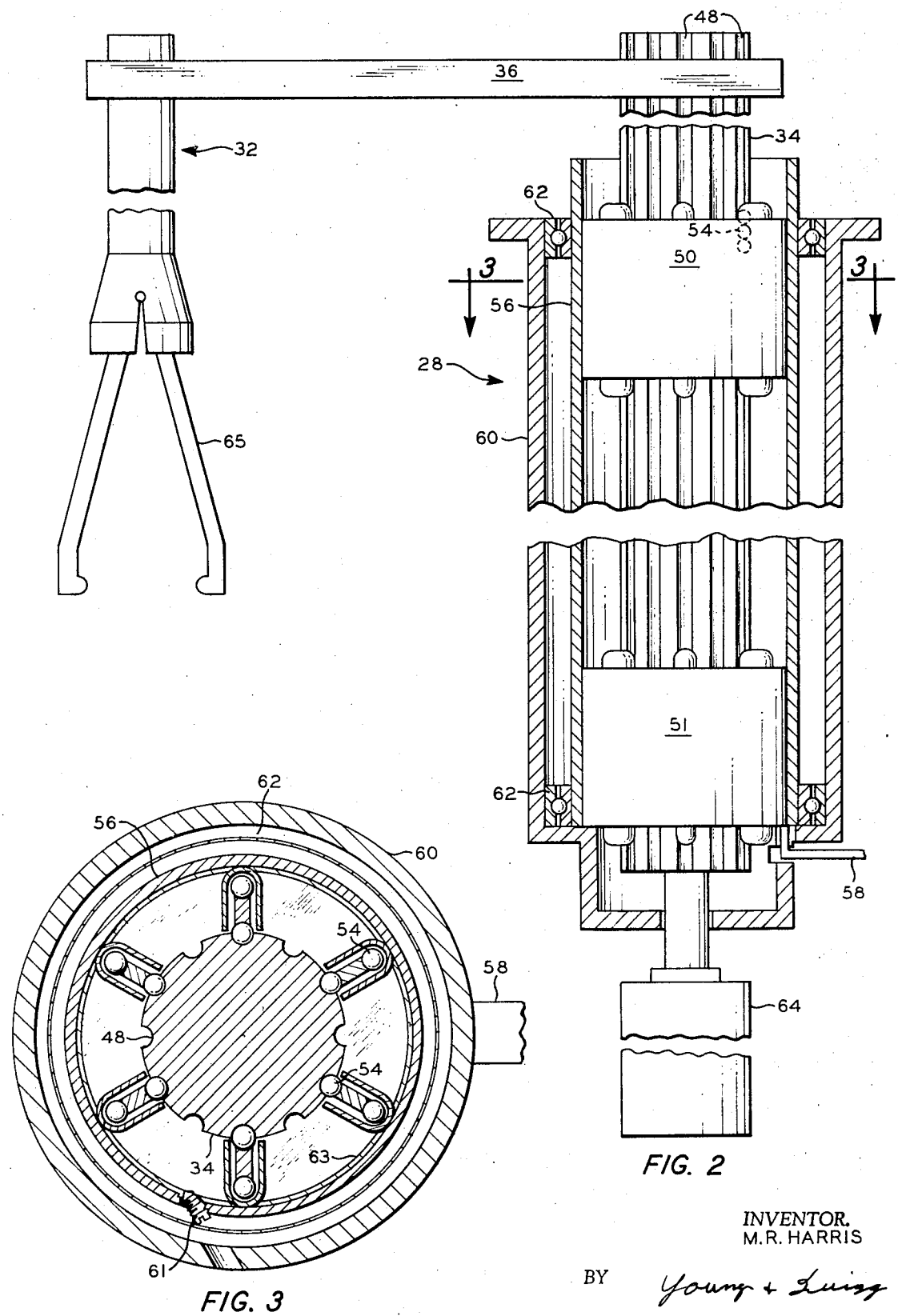
FIG. 2 is a detailed view partially in section of the parison transfer mechanism of FIG. 1.
FIG. 3 is a sectional view along lines 3—3 of FIG. 2.

Referring now to FIG. 2, there is shown in greater detail the transfer mechanism 28. As can be seen shaft 34 is a spline shaft having a plurality of inner race grooves 48 running longitudinally. Surrounding shaft 34 are two ball nuts 50 and 51. Ball bearings 54 fit within race grooves 48 to allow longitudinal movement of shaft 34 relative to ball nuts 50 and 51. Cylindrical housing member 56 is integrally fixed to ball nuts 50 and 51 and has lever 58 which allows rotation of member 56 about the longitudinal axis thereof thus rotating ball nuts 50 and 51 and hence spline shaft 34. Member 56 is carried by frame 60 through bearings 62 so as to allow this rotary movement of member 56. Thus, spline shaft 34 can move longitudinally relative to frame 60, and member 56 can rotate relative to frame 60 thus effecting rotation of shaft 34. Axial movement of shaft 34 is effected by hydraulic cylinder 64. Attached to the upper end of spline shaft 34 is arm 36 which carries depending gripping means 32 having tong members 33 at the end thereof.

FIG. 3 is a cross-sectional view along lines 3—3 of FIG. 2 showing the ball bearing spline shaft as carried by frame 60 in cross section. Set screw 61 impinging on casing 63 of ball nut 50 allows slight rotation of ball nut 50 relative to member 56. Ball nut 51 is fixedly attached to member 56. Thus adjustment of set screw 61 allows rotation of ball nut 50 relative to ball nut 51. This preloads balls 54 against the race grooves of spline shaft 34 to allow rapid movement without angular backlash. Thus, when the rotating housing moves the spline shaft rotates a like amount with essentially zero angular backlash; the shaft still has free linear motion.

Figure 4:
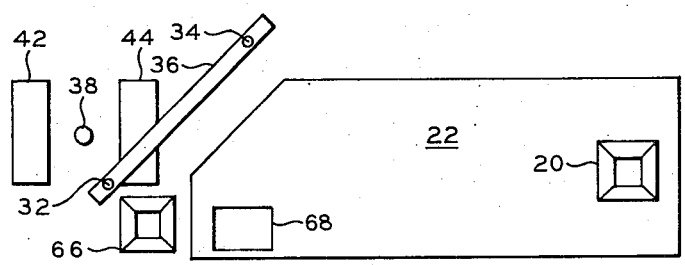
FIG. 4 is a plan view of the entire blow molding apparatus showing the relationship of the transfer means to the heating means and molding station.

Referring now to FIG. 4 it is shown in simple schematic form a plan view depicting the relationship of the various elements as arm 36 carrying gripping means 32 moves from discharge means 68 at oven picker station toward a position over plug 38. Also shown is scrap chute 66 into which the cutoff portion of the parison is depicted on the return of arm 36 into position over discharge means 68.

Thus, the arrangement shown in FIGS. 1 and 4 allows waste motion to be eliminated and the cycle time reduced by carrying out transfer operations during the time that the preceeding parison is cooling. The use of the ball spline as shown in detail in FIGS. 2 and 3 makes it possible to take advantage of the time-saving arrangement of FIGS. 1 and 4 by making possible the rapid rotary and longitudinal movements necessary.

Many conventional parts such as heaters, temperature controllers, frame members and the like have been omitted for the purpose of simplicity but their inclusion is understood by those skilled in the art and is within the scope of the invention.

EXAMPLE

Propylene homopolymer having a density of 0.905 (ASTM D 1505-63T), a melt flow of 2 (ASTM D 1238-62T, Condition L), and a crystalline melting point of about 340°F was extruded into tubing having an outside diameter of about 0.9-inch and a wall thickness of 0.150-inch. The tubing was cooled to room temperature in a vacuum sizing and quenching chamber and cut into 7-inch lengths. These 7-inch lengths were placed on vertically disposed pins carried by a continuous chain within a circulating air oven and passed through said oven. Supplementary heat was imparted by radiant panel heaters. The lengths were heated to a temperature of 320°F. A mechanism identical to that shown in the drawings utilizing two conventional ball nuts of approximately three-inch diameter with one of said ball nuts being rotatable slightly relative to the other to preload the bearing against the spline, gripped the upper end of the parison, lifted it axially out of the oven and transferred it through an arc into position directly over a thread-forming plug identical to that shown in the drawings and descended to place the lower end of the parison over said plug. Thread-forming jaws then closed on the parison, the plug was moved axially upward a short distance, the gripping means was raised to stretch the parison so that the portion between the thread-forming jaws and gripping tongs on the gripping means was stretched to approximately twice its original length. Thereafter preblow air at a pressure of 50 psig was introduced into the interior of the parison to give a slight radial expansion to the parison. Thereafter mold halves were closed on said parison, the upper portion of said mold halves having a configuration including a sealing cavity which produces the tab at the seal area, said upper portion of said mold halves also having a blade means to pinch the parison off the adjacent said tab. Thereafter blow air was introduced to expand the parison on out into complete conformity with mold cavity. The parison transfer arm was rotated to a position over a scrap receiving means and the gripping tongs opened to release the severed upper end of the parison. The mold cavity was then opened and the bottle ejected by blowing additional air through the plug. Total cycle time per bottle per mold was 6 seconds. This was broken down into 4 seconds from the time the mold closed through the time taken for the parison to become self supporting, and 2 seconds for opening the mold, removing the bottle, inserting the new parison and closing the mold. The limiting factor in the operation was these other operations not the speed of the transfer mechanism.

Identical parisons were heated to an identical temperature and made into essentially identical biaxially oriented bottles utilizing prior art apparatus under optimum conditions. Cycle time was 10–12 seconds per bottle per mold.

Parisons exactly identical to those of the Example were processed on an apparatus exactly identical to that of the Example, that is as shown in the FIGURES except that instead of the ball bearing spline shaft the transfer arm moved up and down on two round shafts which rotated as a unit to give angular motion. The operation was unsuccessful due to excessive vibration and chatter in the parison transfer mechanism and the limiting factor in the operation was the speed the transfer mechanism could be moved.

While this invention has been described in detail for the purpose of illustration, it is not to be construed as limited thereby but is intended to cover all changes and modifications within the spirit and scope thereof.

I claim:

1. Apparatus comprising in combination:
   a parison heating means including means to deliver heated parisons in an upright position into place below a discharge means in a top portion of said heating means;
   vertically disposed plug means;
   jaw means, and means to move said jaw means, said jaw means being adapted to cooperate with said plug means to form a neck finish on one end of a parison;
   split mold means above said jaw means;
   a vertically disposed axially slideable spline shaft carried by at least one ball nut, said at least one ball nut being carried by bearing means which bearing means allow rotation of said at least one ball nut and hence said shaft about its longitudinal axis;
   an arm carried by said shaft extending outward from an upper end of said shaft;
   gripping means extending down from an end of said arm, said gripping means being adapted to grip one end of a parison;
   means to move said shaft axially up and down and means to rotate same about said axis;
   means to open and close said mold means;
   and means to introduce fluid pressure into the interior of said parison.

2. Apparatus according to claim 1 wherein said gripping means comprises two tong members which come together to grasp said parison.

3. Apparatus according to claim 1 comprising in addition a scrap chute disposed so as to be under said tongs as said gripping means returns to position above said discharge means.

4. Apparatus according to claim 1 wherein said heating means comprises an air oven with supplemental radiant panel heaters and an endless chain for conveying said parisons through said oven.

5. Apparatus according to claim 1 comprising in addition means to move said plug axially upward and downward.

6. Apparatus according to claim 1 wherein said means to move said shaft axially and said means to rotate same about said axis are adapted so as to move said gripping means down and position said gripping means adjacent a parison in said oven, to thereafter remove said gripping means upward thus lifting said parison out of said oven, to thereafter move said gripping means through an arc stopping directly above said plug, to thereafter move said gripping means downward to position an open bottom end of said parison over said plug, and thereafter to move said gripping means up thus stretching said parison after said means to close said jaw means on said open end of said parison has been actuated.

7. Apparatus according to claim 1 wherein two ball nuts are attached to a housing member, said housing member being carried by said bearing means, said apparatus comprising in addition means to rotate said two ball nuts relative to each other so as to preload balls of said ball nuts against inner race grooves of said spline shaft.

* * * * *